US008933997B2

(12) United States Patent
Furuta et al.

(10) Patent No.: US 8,933,997 B2
(45) Date of Patent: Jan. 13, 2015

(54) VIDEO OUTPUT APPARATUS AND METHOD FOR CONTROLLING THE SAME

(75) Inventors: Hirotaka Furuta, Yokohama (JP); Yuji Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 831 days.

(21) Appl. No.: 12/759,353

(22) Filed: Apr. 13, 2010

(65) Prior Publication Data

US 2010/0277574 A1 Nov. 4, 2010

(30) Foreign Application Priority Data

May 1, 2009 (JP) ................................. 2009-112296

(51) Int. Cl.
*H04N 13/04* (2006.01)
(52) U.S. Cl.
CPC ................ *H04N 13/0497* (2013.01)
USPC ..................................................... 348/51
(58) Field of Classification Search
CPC ..................... H04N 13/0497; H04N 2213/002
USPC ..................................................... 348/10–60
See application file for complete search history.

(56) References Cited

U.S. PATENT DOCUMENTS

| 7,605,776 | B2 * | 10/2009 | Satoh et al. ....................... 345/9 |
| 2001/0043266 | A1 * | 11/2001 | Robinson et al. ................ 348/53 |
| 2005/0089212 | A1 * | 4/2005 | Mashitani et al. ............ 382/154 |
| 2006/0152579 | A1 * | 7/2006 | Utsugi et al. .................... 348/51 |
| 2006/0192851 | A1 | 8/2006 | Sugahara et al. |
| 2006/0268105 | A1 * | 11/2006 | Jacobs et al. ..................... 348/53 |
| 2007/0257902 | A1 * | 11/2007 | Satoh et al. .................... 345/419 |
| 2009/0220213 | A1 * | 9/2009 | Ogawa et al. .................... 386/95 |
| 2010/0177254 | A1 * | 7/2010 | MacNaughton et al. ....... 349/15 |
| 2010/0238267 | A1 * | 9/2010 | Izzat et al. ....................... 348/43 |
| 2012/0062711 | A1 * | 3/2012 | Ikeda et al. ...................... 348/51 |

FOREIGN PATENT DOCUMENTS

| JP | 2006-270924 | 10/2006 |
| WO | 2008/115222 A1 | 9/2008 |

OTHER PUBLICATIONS

The above reference was cited in a Jul. 5, 2013 Japanese Office Action, which is enclosed without an English Translation, that issued in Japanese Patent Application No. 2009-112296.

* cited by examiner

*Primary Examiner* — William C Vaughn, Jr.
*Assistant Examiner* — Naod Belai
(74) *Attorney, Agent, or Firm* — Cowan, Liebowitz & Latman, P.C.

(57) ABSTRACT

There is provided a method for controlling a video output apparatus that displays on a display device three-dimensional video that a viewer facing a display surface of the display device can perceive as video protruding from the display surface to a viewer side, the method comprising steps of: acquiring a maximum protruding amount that is a value corresponding to a maximum protruding degree that the viewer perceives if the three-dimensional video is displayed on the display device; generating, using the acquired maximum protruding amount, a notification three-dimensional image for letting the viewer perceive the maximum protruding amount from the display surface; and displaying the generated notification three-dimensional image on the display device.

19 Claims, 6 Drawing Sheets

VIDEO OUTPUT APPARATUS AND METHOD FOR CONTROLLING THE SAME

BACKGROUND OF THE INVENTION

1. Field of the Invention

The present invention relates to a video output apparatus and a method for controlling the same.

2. Description of the Related Art

In recent years, broadcasting stations that broadcast three-dimensional video (3D video) have been appearing. Further, recording media (for example, Blu-ray discs) are also sold that contain content such as movies including 3D video. Display of 3D video is realized by utilizing the binocular parallax of the right eye and the left eye. As a main approach to display 3D video, there is a time division approach using glasses dedicated to stereoscopic vision.

In the time division approach, video to be viewed by the left eye or the right eye is alternately switched and displayed in certain units of time (generally, in units of frames or in units of fields). Glasses dedicated to stereoscopic vision can switch between penetration and non-penetration of the left and right lenses, using a liquid crystal shutter, for example. In synchronization with the switching cycle of video to be displayed, switching between penetration and non-penetration is performed. This enables a user to view 3D video.

It has been known that such simulated 3D video may have a harmful effect on a human body. For example, if the protruding amount of 3D video is equal to or larger than a certain amount, a symptom in which the brain is confused (so-called "3D sickness") easily occurs due to the focus adjustment function of the eyeballs and spatial shifts of video being viewed. For this reason, the Japan Electronics and Information Technology Industries Association (JEITA), and the International Organization for Standardization (ISO) have been creating a guideline for a protruding amount.

Further, there is a problem in that if video including a large protruding amount is suddenly displayed (i.e., in a state in which a viewer is not mentally prepared) while viewing 3D video, the viewer feels greater surprise than usual. In consideration of the above problem, it has been proposed that information on the degree to which a specific viewer is influenced due to a protruding amount of three-dimensional video (3D video), and a protruding amount of the actual three-dimensional video are compared, and if the protruding amount is above an allowable degree for such a specific viewer, the protruding amount is adjusted (Japanese Patent Laid-Open No. 2006-270924).

However, in Japanese Patent Laid-Open No. 2006-270924, if a viewer's biological information is inaccurate, the protruding amount is limited more than necessary, so that the viewer is prevented from viewing 3D video with three-dimensional depth (protruding amount) that he or she expects. Further, a large-scale apparatus is necessary to acquire accurate biological information of viewers, which is not preferable in terms of man-hours for development or spread.

SUMMARY OF THE INVENTION

The present invention has been made in view of this situation, and provides mechanisms whereby a user's surprise due to 3D video with a large protruding amount is reduced using a comparatively simple configuration.

According to an aspect of the present invention, there is provided a method for controlling a video output apparatus that displays on a display device three-dimensional video that a viewer facing a display surface of the display device can perceive as video protruding from the display surface to a viewer side, the method comprising steps of: acquiring a maximum protruding amount that is a value corresponding to a maximum protruding degree that the viewer perceives if the three-dimensional video is displayed on the display device; generating, using the acquired maximum protruding amount, a notification three-dimensional image for letting the viewer perceive the maximum protruding amount from the display surface; and displaying the generated notification three-dimensional image on the display device.

According to another aspect of the present invention, there is provided a method for controlling a video output apparatus that displays on a display device three-dimensional video that a viewer facing a display surface of the display device can perceive as video protruding from the display surface to a viewer side, the method comprising steps of: acquiring maximum parallax information from attribute information of the three-dimensional video, wherein the maximum parallax information is a parallax amount of a scene where image formation of video is performed at a position of space nearest to the viewer, among the scenes in the three-dimensional video; generating a three-dimensional image using the maximum parallax information; and displaying the generated three-dimensional image on the display device at a time of display start of the three-dimensional video, or while the three-dimensional video is being displayed.

According to yet another aspect of the present invention, there is provided a video output apparatus that displays on a display device three-dimensional video that a viewer facing a display surface of the display device can perceive as video protruding from the display surface to a viewer side, the video output apparatus comprising: an acquisition unit that acquires a maximum protruding amount that is a value corresponding to a maximum protruding degree that the viewer perceives if the three-dimensional video is displayed on the display device; a generation unit that generates, using the acquired maximum protruding amount, a notification three-dimensional image for letting the viewer perceive the maximum protruding amount from the display surface; and a display unit that displays the generated notification three-dimensional image on the display device.

According to another aspect of the present invention, there is provided a video output apparatus that displays on a display device three-dimensional video that a viewer facing a display surface of the display device can perceive as video protruding from the display surface to a viewer side, the video output apparatus comprising: an acquisition unit that acquires maximum parallax information from attribute information of the three-dimensional video, wherein the maximum parallax information is a parallax amount of a scene where image formation of video is performed at a position of space nearest to the viewer, among the scenes in the three-dimensional video; a generation unit that generates a three-dimensional image using the maximum parallax information; and a display unit that displays the generated three-dimensional image on the display device at a time of display start of the three-dimensional video, or while the three-dimensional video is being displayed.

According to the present invention, with the above configurations, it is possible to reduce a user's surprise due to 3D video with a large protruding amount using a comparatively simple configuration.

Further features of the present invention will become apparent from the following description of exemplary embodiments with reference to the attached drawings.

DESCRIPTION OF THE EMBODIMENTS

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

Here, a definition of a "maximum protruding amount" used in the embodiments below is described. If three-dimensional video (3D video) having a predetermined reproduction time period (for example, a broadcast time period of a certain broadcast program) is displayed on a display apparatus, a user (viewer) perceives at least a portion of this 3D video as video that protrudes from the display surface of the display apparatus (to the viewer side). The "maximum protruding amount" is the longest distance of video to be displayed that protrudes in this way from the display surface of the display apparatus, in the direction in which the video protrudes from the display surface. However, as described in the embodiments below, the maximum protruding amount may be broadcast or recorded in association with 3D video, or it may be stored as a distance determined in advance in a video output apparatus of the present invention. In the latter case, the maximum protruding amount does not necessarily represent the actual longest distance of the 3D videos. However, even in this case, with the use of a standard distance for 3D video as the "distance determined in advance", it is expected that the maximum protruding amount will indicate the distance generally close to the actual longest distance. Therefore, the maximum protruding amount is utilized as index information that is indicative of the longest distance.

First Embodiment

Figure 1:
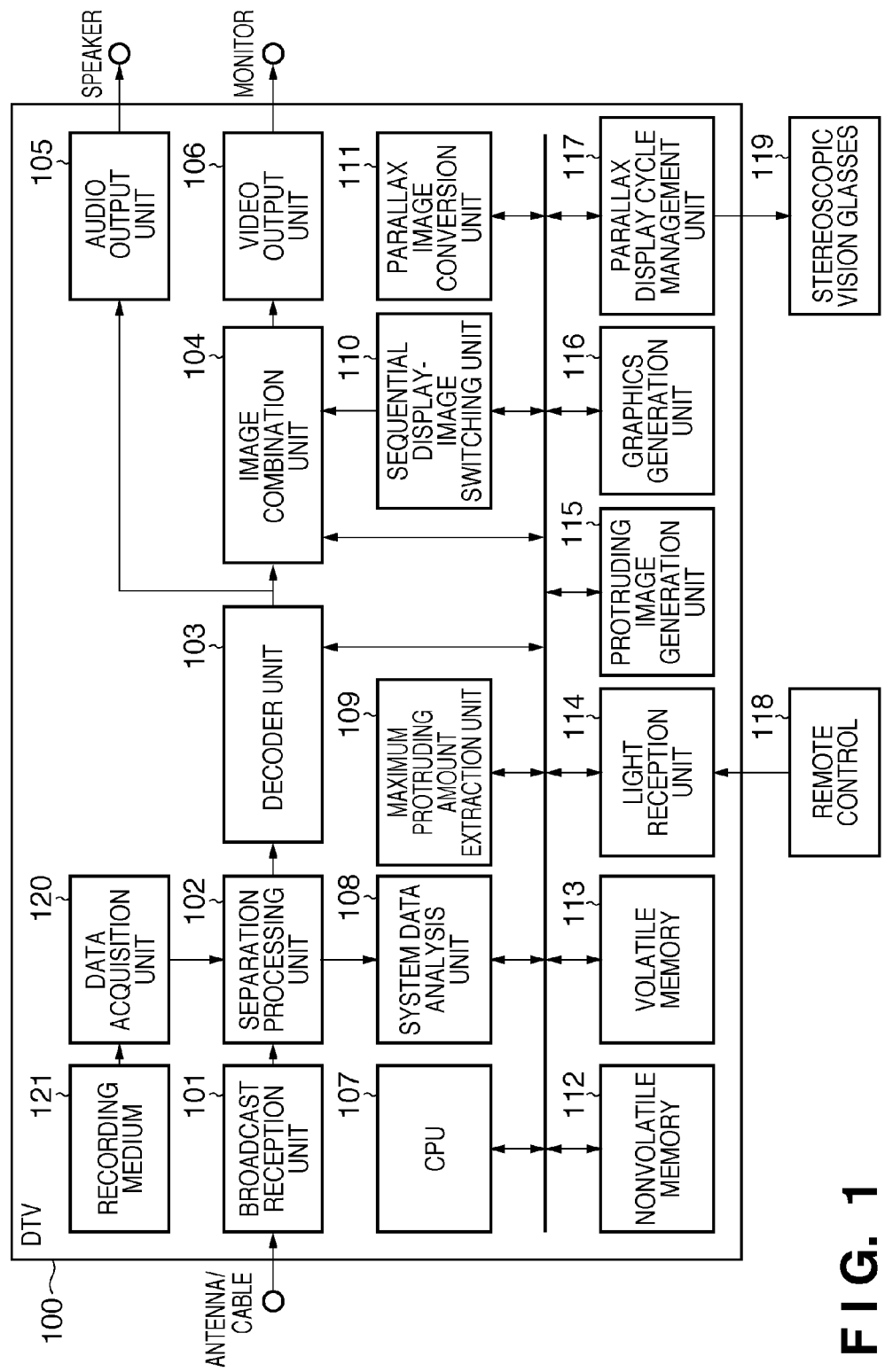
FIG. 1 is a diagram showing the configuration of a DTV 100 according to a first embodiment.

An embodiment in which a video output apparatus of the present invention is applied to a digital television (DTV) is described. FIG. 1 is a diagram showing the configuration of a DTV 100 according to a first embodiment.

In FIG. 1, a broadcast reception unit 101 receives a broadcast signal via an antenna or a cable. The broadcast reception unit 101 generates digital data in a format called TS (transport stream) by performing processing such as demodulation and error correction on the received broadcast signal.

A separation processing unit 102 (video acquisition means) extracts video data, audio data, and subtitle data from TS data acquired from the broadcast reception unit 101, and outputs the extracted data to a decoder unit 103. The separation processing unit 102 also outputs data necessary for various reproduction controls (so-called system data), such as copy control information and maximum protruding amount information, from TS data, to a system data analysis unit 108.

The decoder unit 103 decodes video data, audio data, and subtitle data that have been input. Then, the decoder unit 103 outputs the video and subtitles that have been decoded to an image combination unit 104, and outputs the audio that has been decoded to an audio output unit 105. If the video data represents 3D video, the decoder unit 103 sequentially outputs video for the left eye and video for the right eye, in conformity with display cycle information managed by a parallax display cycle management unit 117 described later.

The image combination unit 104 combines video and subtitles input from the decoder unit 103, an image generated by a graphics generation unit 116 described later, and a parallax image input from a sequential display-image switching unit 110 described later. In this case, the image combination unit 104 superimposes the images using an appropriate penetration rate (for example, so-called a blending is executed), such that the parallax image appears in the foreground. The image combination unit 104 outputs the image obtained as a result of combination to a video output unit 106.

The video output unit 106 converts an input image into an appropriate output signal, and outputs the result to a monitor. The audio output unit 105 converts audio input from the decoder unit 103 into an appropriate output signal, and outputs the result to a speaker.

A CPU 107 executes overall control of the units of the DTV 100. A nonvolatile memory 112 holds a control program executed by the CPU 107, and a volatile memory 113 is used as a work area when the CPU 107 executes the control program.

A light reception unit 114 receives a signal from a remote control 118. The user can give various instructions to the DTV 100 by operating the remote control 118.

The graphics generation unit 116 generates an image for OSD (On Screen Display) regarding video and an apparatus, and an image for a GUI (Graphical User Interface), and outputs the generated image to the image combination unit 104. The graphics generation unit 116 can use the volatile memory 113 as a work area for image generation processing.

The system data analysis unit 108 records system data input from the separation processing unit 102 in the nonvolatile memory 112 or the volatile memory 113. The system data analysis unit 108 also manages updating of information regarding system data that has been recorded, for instance.

A maximum protruding amount extraction unit 109 (index acquisition means) extracts information indicating the maximum protruding amount of 3D video output by the video output unit 106, and notifies a parallax image conversion unit 111 of the extracted information. The maximum protruding amount may be, for example, a value in conformity with a guideline drawn up by the industry or the like, and may be stored in the nonvolatile memory 112. Alternatively, the maximum protruding amount may be included in system data acquired by the system data analysis unit 108, and its value may differ depending on the content. In the latter case, the user can confirm the actual maximum protruding amount of content to be viewed (for example, a certain movie) in accordance with the processing shown in FIG. 2 described later. Alternatively, the maximum protruding amount extraction unit 109 may attempt to acquire the maximum protruding amount derived from system data first, and if the amount cannot be acquired, the maximum protruding amount extraction unit 109 may acquire a maximum protruding amount statically stored in the nonvolatile memory 112.

Furthermore, the maximum protruding amount extraction unit 109 may acquire both of the maximum protruding amount derived from system data, and the maximum protruding amount statically stored in the nonvolatile memory 112.

Then, the CPU 107 may compare both of the maximum protruding amounts, and if the former exceeds the latter, the CPU 107 may control the graphics generation unit 116 to display a warning on the monitor.

A protruding image generation unit 115 generates an image for confirmation of the maximum protruding amount, and stores the generated image in the volatile memory 113. The parallax image conversion unit 111 converts this image into parallax images for left and right eyes, such that the image generated by the protruding image generation unit 115 is displayed in a state of protruding the maximum protruding amount acquired by the maximum protruding amount extraction unit 109, and stores the converted images in the volatile memory 113. Accordingly, the image that the protruding image generation unit 115 stores in the volatile memory 113 is a three-dimensional image.

The parallax display cycle management unit 117 manages time division cycle information for displaying 3D video, that is, whether a current frame or field is for the right eye or the left eye. Stereoscopic vision glasses 119, the sequential display-image switching unit 110, and the decoder unit 103 are notified of this cycle information.

The stereoscopic vision glasses 119 control filter settings for left and right lenses (for example, penetration/non-penetration of the left and right lenses, respectively), in accordance with the cycle information managed by the parallax display cycle management unit 117.

The sequential display-image switching unit 110 selects either one of the parallax images for the right eye and the left eye generated by the parallax image conversion unit 111 in accordance with the cycle information managed by the parallax display cycle management unit 117, and outputs the selected image to the image combination unit 104.

Note that the separation processing unit 102, instead of acquiring TS data from the broadcast reception unit 101, may acquire TS data (or PS (program stream) data) from a recording medium 121 (for example, an HDD) via a data acquisition unit 120. In the latter case, the system data analysis unit 108 may directly acquire system data from the data acquisition unit 120 without involving the separation processing unit 102.

Next, display processing for displaying a maximum protruding amount confirmation image according to the first embodiment is described with reference to FIG. 2. The processing in each step in this flowchart is realized by the CPU 107 controlling the units of the DTV 100 in accordance with the control program, except where specifically noted otherwise.

In step S201, the CPU 107 determines whether or not the light reception unit 114 has received a "maximum protruding amount confirmation request" from the remote control 118, and if it has been received, the processing proceeds to step S202. In step S202, the protruding image generation unit 115 generates a maximum protruding amount confirmation image (protruding image) to be displayed at a maximum protruding position. In step S203, the parallax image conversion unit 111 converts the protruding image into parallax images for left and right eyes based on the maximum protruding amount notified from the maximum protruding amount extraction unit 109, such that the protruding image is displayed at the maximum protruding position.

In step S204, the CPU 107 determines whether or not the stereoscopic vision glasses 119 are executing a penetration/non-penetration switching operation, via the parallax display cycle management unit 117. If the operation is being executed, the processing proceeds to step S206, and if the operation is not being executed, the processing proceeds to step S205. In step S205, the CPU 107 gives an instruction to the stereoscopic vision glasses 119 to start executing the switching operation via the parallax display cycle management unit 117.

In step S206, the sequential display-image switching unit 110 determines whether or not the current cycle is for the left eye by referencing the parallax display cycle management unit 117. If the determination result is "YES", in step S207, the sequential display-image switching unit 110 outputs a parallax image for the left eye to the image combination unit 104, and the image combination unit 104 superimposes the input parallax image. If the determination result is "NO", in step S208, the sequential display-image switching unit 110 outputs a parallax image for the right eye to the image combination unit 104, and the image combination unit 104 superimposes the input parallax image.

Figure 3:
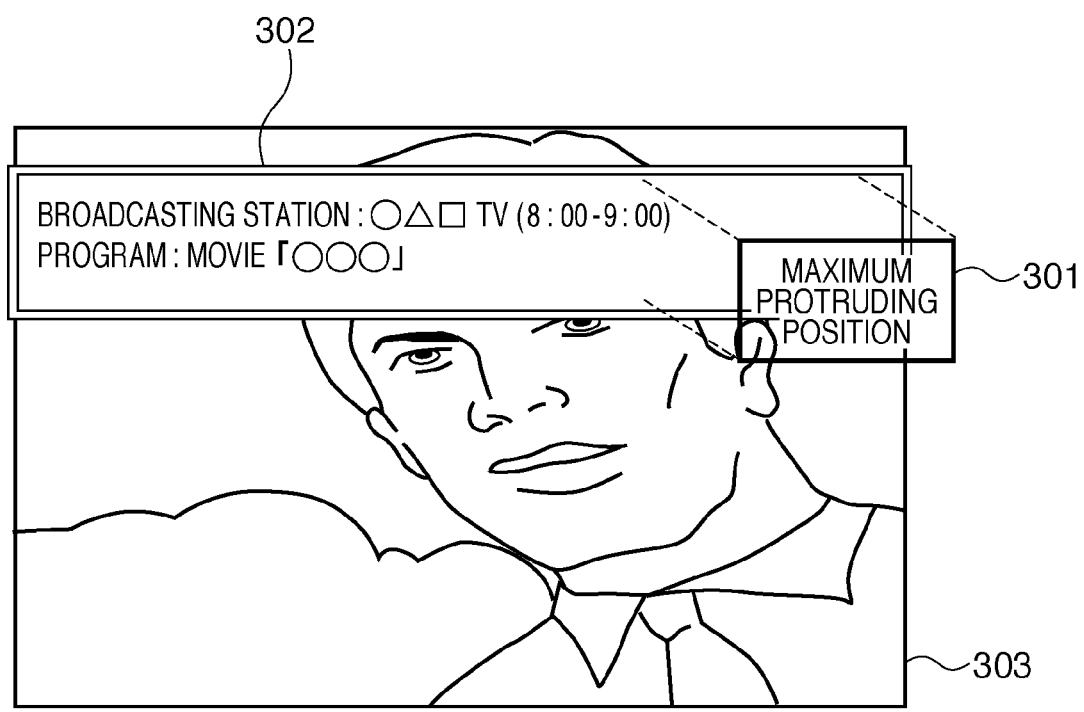
FIG. 3 is a diagram showing a display example of the protruding image according to the first embodiment.

If a parallax image is superimposed in step S207 or S208, the user wearing the stereoscopic vision glasses 119 can see a protruding image 301 that protrudes the maximum protruding amount as shown in FIG. 3, for example. In the example shown in FIG. 3, the protruding image 301 includes text, namely "maximum protruding position", and this text enables the user to perceive that the protruding image 301 serves as a maximum protruding position confirmation image. Also, the protruding image generation unit 115 may generate a protruding image accompanied with different text (for example, "big" or "small") according to the maximum protruding amount. Further, although the protruding image 301 is displayed in a state of being superimposed on a portion of an OSD image 302 in the example of FIG. 3, instead, the protruding image 301 may be displayed on an entire screen 303.

In step S209, the CPU 107 determines whether or not the light reception unit 114 has received the "maximum protruding amount confirmation end request" from the remote control 118, and if it has been received, the processing proceeds to step S211, and if it has not been received, the processing proceeds to step S210.

In step S210, the CPU 107 determines whether or not a predetermined time has elapsed since the display start of the protruding image (i.e., since the processing in step S207 or S208 is executed first), and if it has elapsed, the processing proceeds to step S211, and if it has not elapsed, the processing returns to step S206.

In step S211, the CPU 107 gives an instruction to the units of the DTV 100 so as to stop displaying the protruding image.

As described above, according to the first embodiment, the DTV 100 outputs a 3D image for confirmation that is displayed at a protruding position corresponding to the maximum protruding amount, in response to a user instruction.

The user can thereby be informed in advance how much the video to be displayed protrudes, thus enabling reduction of a user's surprise given when 3D video with a large protruding amount is displayed.

First Modified Example

Although a protruding image is displayed in response to a user request in the first embodiment (see step S201 in FIG. 2), the display timing is not limited to this. For example, as described below with reference to the flowchart shown in FIG. 4, the DTV 100 may automatically display a protruding image at the time when the content being viewed is switched to content including 3D video (3D content). Thereby, an operation burden on the user can be reduced.

Figure 2:
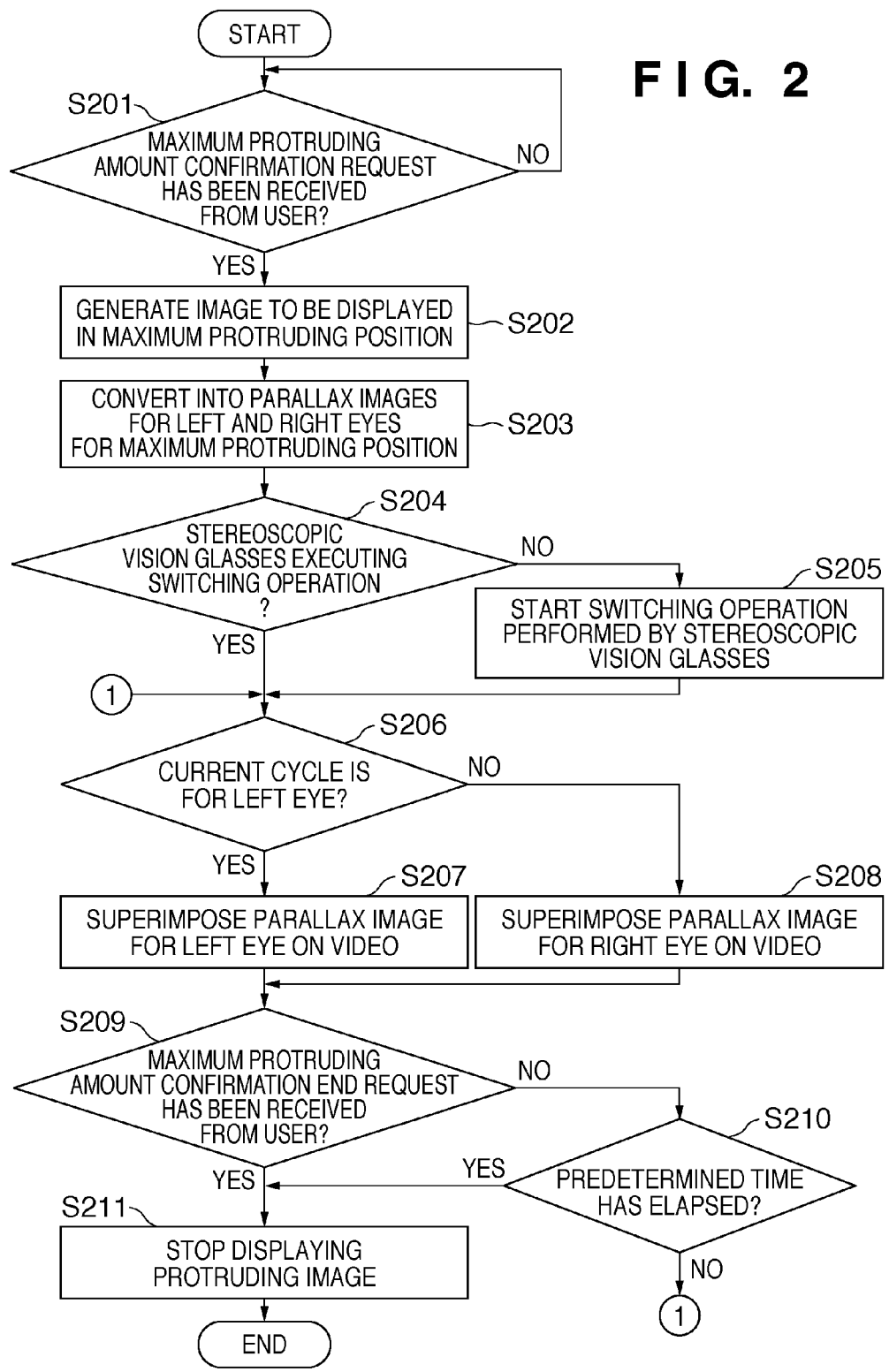
FIG. 2 is a flowchart showing display processing for displaying a maximum protruding amount confirmation image (protruding image) according to the first embodiment.
Figure 4:
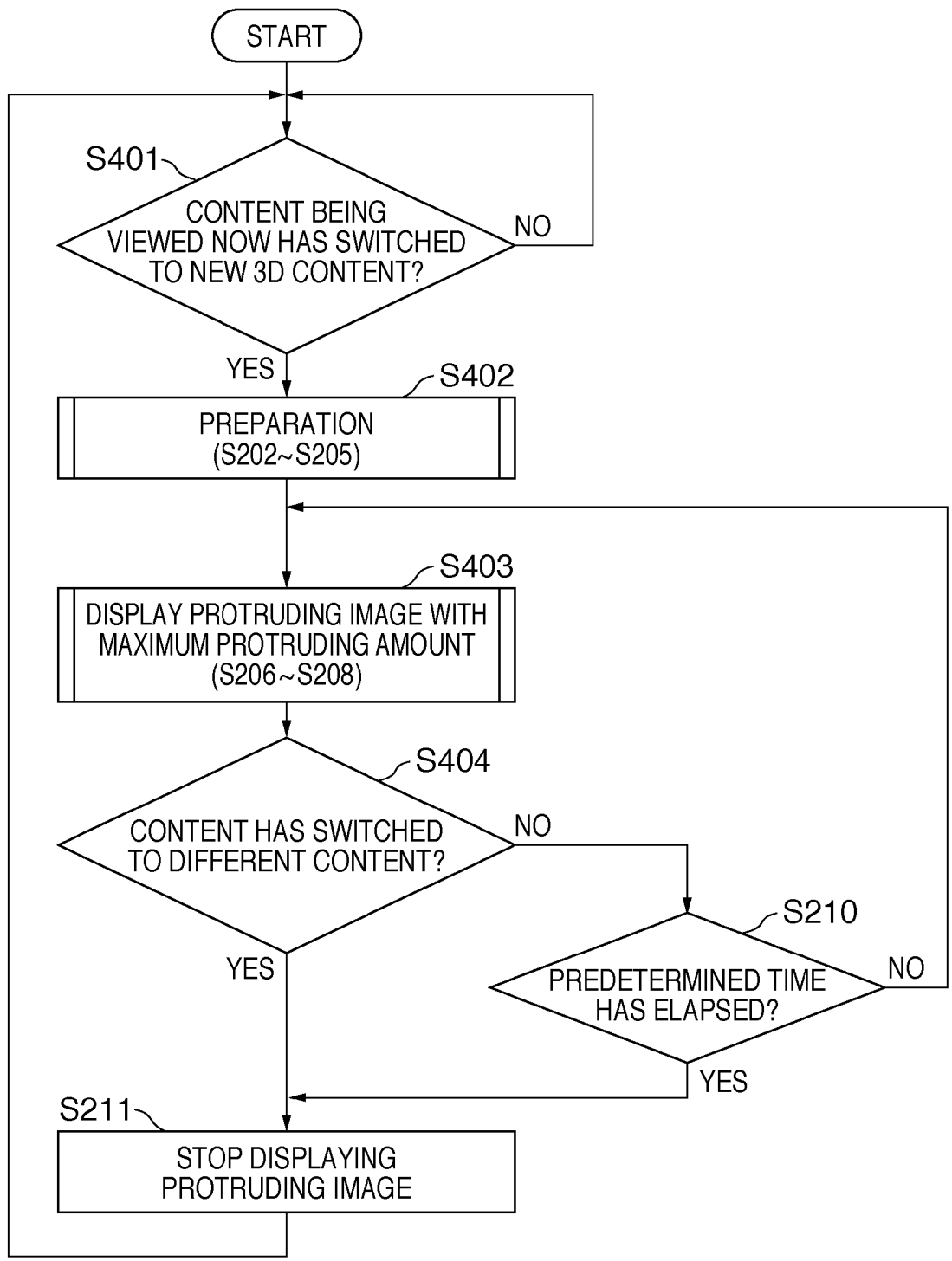
FIG. 4 is a flowchart showing display processing for displaying a protruding image according to a first modified example.

In FIG. 4, the same numerals are given to the steps in which the same processing as or similar processing to that in the steps in FIG. 2 is performed, and thus a description thereof is omitted. Further, the processing shown in the flowchart continues to be executed while the DTV 100 is outputting video.

In step S401, the CPU 107 determines whether or not the content that is being viewed has switched to new 3D content using the system data analysis unit 108, and if it has switched, the processing proceeds to step S402. In step S402, similar preparation processing to that in steps S202 to S205 in FIG. 2 is performed.

In step S403, the DTV 100 outputs (displays) a protruding image similar to steps S206 to S208 in FIG. 2.

In step S404, the CPU 107 determines whether or not the 3D content that is being viewed has switched to different content using the system data analysis unit 108, and if it has switched, the processing returns to step S401 via step S211. Therefore, if the content that has been switched to is 3D content again, the processing proceeds from step S401 to step S402 again.

"Switching" of content performed in steps S401 and S404 may include a broadcast program being switched, a broadcasting station being switched, and a caption that is being reproduced being switched. Also, in addition to these, the maximum protruding amount in system data being changed may be considered as "switching" of content.

Other than the timing described with reference to FIG. 4, a protruding image may be displayed in synchronization with a content reproduction start instruction, for example. Alternatively, a protruding image may be displayed in synchronization with the display of the OSD image 302 as shown in FIG. 3.

Second Modified Example

Figure 5:
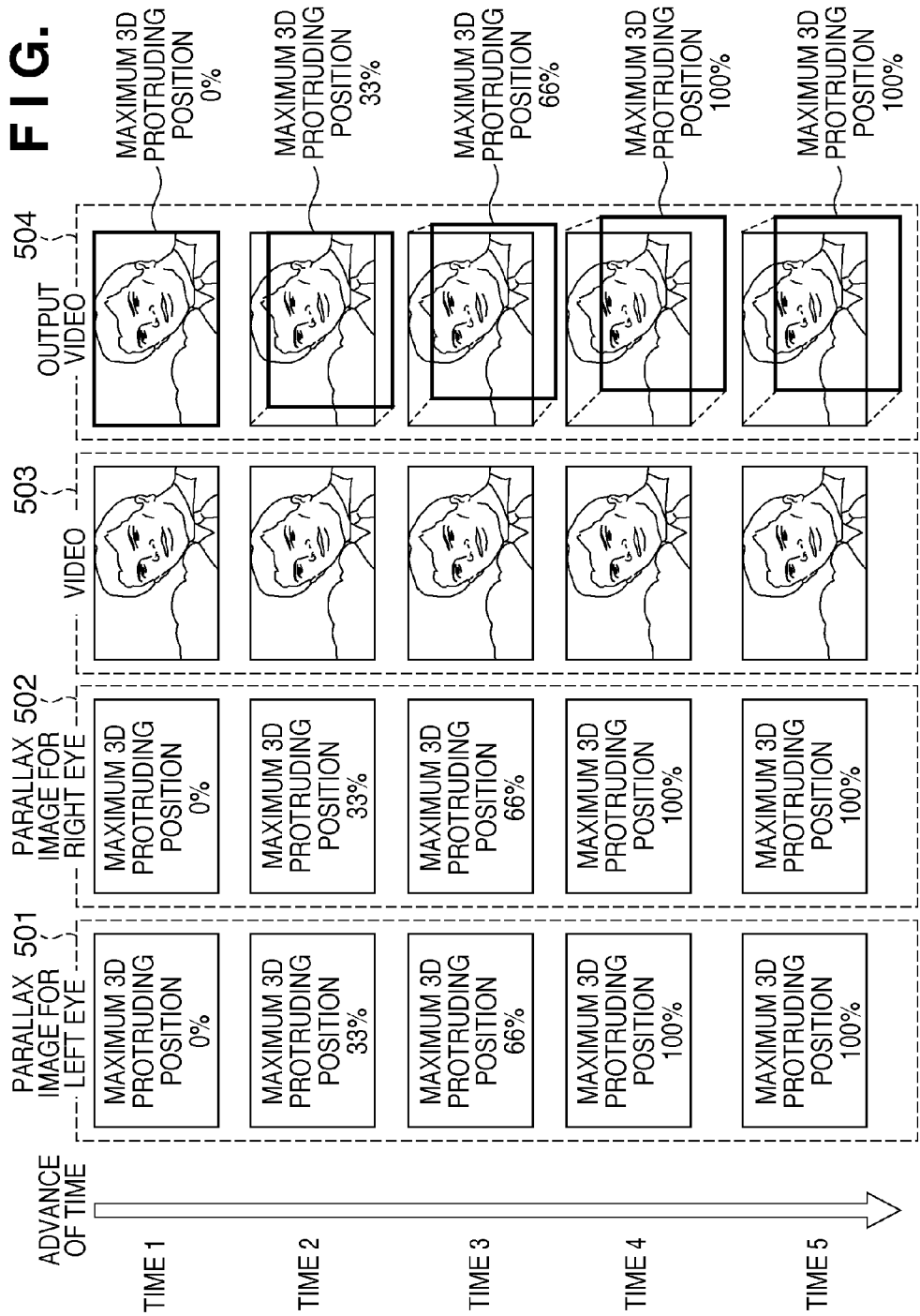
FIG. 5 is a diagram showing display examples of protruding images according to a second modified example.
Figure 6:
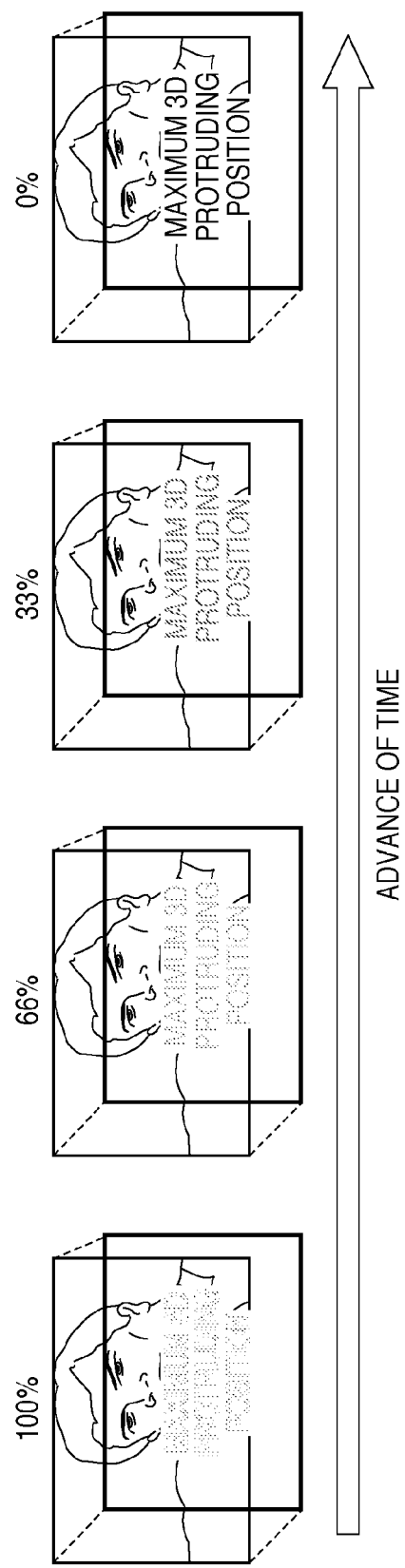
FIG. 6 is a diagram showing other display examples of protruding images according to the second modified example.

Here, a description is given with reference to FIGS. 5 and 6, regarding configurations devised to reduce a user's surprise due to the protruding image itself.

In FIG. 5, time advances from the upper part of the diagram to the lower part thereof. The parallax image conversion unit 111 converts a protruding image into parallax images for left eyes 501, and parallax images for right eyes 502, such that a protruding amount gradually changes from 0 to the maximum value (100%) at predetermined time intervals from the display start of the protruding image. In order to realize this operation, step S203 in FIG. 2 may be incorporated into step S206, and the parallax image conversion unit 111 may generate parallax images in a state of also taking the elapsed time from the display start of the protruding image into consideration.

Accordingly, protruding images that protrude 0%, 33%, 66%, 100%, and 100% of the maximum protruding amount are displayed at Time 1, 2, 3, 4, and 5 in the stated order, for example. Therefore, a protruding image will gradually protrude until when a predetermined time elapses, thus reducing a user's surprise due to the display of a protruding image itself.

Further, methods other than the method described with reference to FIG. 5 may be adopted. For example, as shown in FIG. 6, a penetration rate of a parallax image for when the image combination unit 104 performs a blending of the parallax image on video may be gradually decreased from 100% as time advances. The user may not so strongly perceive a protruding image while a penetration rate is high, thus reducing a user's surprise.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-112296, filed on May 1, 2009, which is hereby incorporated by reference herein in its entirety.

What is claimed is:

1. A method for controlling a video output apparatus that outputs three-dimensional video on a display device, the method comprising steps of:
storing information regarding a predetermined protruding amount;
acquiring the information regarding the predetermined protruding amount;
generating, based on the information regarding the predetermined protruding amount acquired in the step of acquiring, a notification image to be displayed in a manner that it protrudes from a display surface of the display device;
receiving a protruding amount confirmation request for requesting to display the notification image so that a user can confirm the predetermined protruding amount;
determining, by the video output apparatus, in response to the protruding amount confirmation request received in the step of receiving, whether or not a viewing device is in a predetermined state in which the user can perceive a three-dimensional image protruding from the display surface of the display device;
performing a control, by the video output apparatus, so that the viewing device enters the predetermined state if it is determined, in the step of determining whether or not a viewing device is in a predetermined state, that the viewing device is not in the predetermined state;
outputting, in response to the protruding amount confirmation request received in the step of receiving, the notification image generated in the step of generating to the display device; and
determining whether or not content which is being viewed has switched to different content,
wherein the step of outputting stops outputting the notification image in response to determining that the content which is being viewed has switched to the different content, and
wherein the step of outputting stops outputting the notification image when a predetermined time has elapsed since the step of outputting started outputting the notification image.

2. The method for controlling the video output apparatus according to claim 1,
wherein in the step of generating, a notification image is generated whose protruding amount gradually increases and approaches the predetermined protruding amount, as time advances from a point in time when the notification image is displayed.

3. The method for controlling the video output apparatus according to claim 1,
wherein in the step of outputting, the notification image is combined on the three-dimensional video, and the combined image is output.

4. The method for controlling the video output apparatus according to claim 1,
wherein in the step of generating, a notification image is generated whose penetration rate gradually decreases, as time advances from a point in time when the notification image is displayed.

5. The method for controlling the video output apparatus according to claim 1,
wherein in the step of outputting, the notification image is output so that it is displayed on an entire display surface of the display device.

6. The method for controlling the video output apparatus according to claim 1,
wherein in the step of outputting, the notification image is output so that it is displayed on a portion of the display surface of the display device.

7. A non-transitory computer-readable storage medium for storing a program that causes a computer to execute the method for controlling the video output apparatus according to claim 1.

8. The method for controlling the video output apparatus according to claim 1, wherein the viewing device comprises stereoscopic vision glasses.

9. The method for controlling the video output apparatus according to claim 8,
wherein in the step of determining whether or not a viewing device is in a predetermined state, it is determined whether or not the stereoscopic vision glasses are executing a penetration/non-penetration switching operation, and
in the step of performing, a control is performed so that the stereoscopic vision glasses start executing the penetration/non-penetration switching operation if it is determined, in the step of determining whether or not a viewing device is in a predetermined state, that the stereoscopic vision glasses are not executing the penetration/non-penetration switching operation.

10. The method for controlling the video output apparatus according to claim 1, wherein the step of determining whether or not content which is being viewed has switched to different content determines that the content which is being viewed has switched to the different content in a case where a predetermined condition is satisfied, the predetermined condition being that a broadcast program has been switched, that a broadcasting station has been switched, that a caption that is being reproduced has been switched, or that a maximum protruding amount in system data has been changed.

11. A video output apparatus that outputs three-dimensional video on a display device, the video output apparatus comprising:
a memory that stores information regarding a predetermined protruding amount;
one or more processors carrying out functions of an acquisition unit, a generation unit, a receiving unit, a first determination unit, a control unit, an outputting unit, and a second determination unit;
the acquisition unit acquiring the information regarding the predetermined protruding amount;
the generation unit generating, based on the information regarding the predetermined protruding amount acquired by the acquisition unit, a notification image to be displayed in a manner that it protrudes from a display surface of the display device;
the receiving unit receiving a protruding amount confirmation request for requesting to display the notification image so that a user can confirm the predetermined protruding amount;
the first determination unit determining, in response to the protruding amount confirmation request received by the receiving unit, whether or not a viewing device is in a predetermined state in which the user can perceive a three-dimensional image protruding from the display surface of the display device;
the control unit performing a control so that the viewing device enters the predetermined state if it is determined by the first determination unit that the viewing device is not in the predetermined state;
the outputting unit outputting, in response to the protruding amount confirmation request received by the receiving unit, the notification image generated by the generation unit to the display device; and
the second determination unit determining whether or not content which is being viewed has switched to different content,
wherein the outputting unit stops outputting the notification image in response to determining that the content which is being viewed has switched to the different content, and
wherein the outputting unit stops outputting the notification image when a predetermined time has elapsed since the outputting unit started outputting the notification image.

12. The video output apparatus according to claim 11,
wherein the generation unit generates a notification image whose protruding amount gradually increases and approaches the predetermined protruding amount, as time advances from a point in time when the notification image is displayed.

13. The video output apparatus according to claim 11,
wherein the outputting unit combines the notification image on the three-dimensional video, and outputs the combined image.

14. The video output apparatus according to claim 11,
wherein the generation unit generates a notification image whose penetration rate gradually decreases, as time advances from a point in time when the notification image is displayed.

15. The video output apparatus according to claim 11,
wherein the outputting unit outputs the notification image so that it is displayed on an entire display surface of the display device.

16. The video output apparatus according to claim 11,
wherein the outputting unit outputs the notification image so that it is displayed on a portion of the display surface of the display device.

17. The video output apparatus according to claim 11, wherein the viewing device comprises stereoscopic vision glasses.

18. The video output apparatus according to claim 17,
wherein the first determination unit determines whether or not the stereoscopic vision glasses are executing a penetration/non-penetration switching operation, and
the control unit performs a control so that the stereoscopic vision glasses start executing the penetration/non-penetration switching operation if it is determined by the first determination unit that the stereoscopic vision glasses are not executing the penetration/non-penetration switching operation.

19. The video output apparatus according to claim 10, wherein the second determination unit determines that the content which is being viewed has switched to the different content in a case where a predetermined condition is satisfied, the predetermined condition being that a broadcast program has been switched, that a broadcasting station has been switched, that a caption that is being reproduced has been switched, or that a maximum protruding amount in system data has been changed.

* * * * *